United States Patent [19]

Stevens

[11] 4,337,966
[45] Jul. 6, 1982

[54] FOLDING UTILITY CART

[76] Inventor: Roger D. Stevens, 323 W. Highland Ave., Sierra Madre, Calif. 91024

[21] Appl. No.: 146,746

[22] Filed: May 5, 1980

[51] Int. Cl.³ .............................................. B62B 1/12
[52] U.S. Cl. ................................... 280/645; 280/47.2; 280/47.33; 280/652; 280/654; 280/659
[58] Field of Search ............... 280/645, 641, 652, 654, 280/655, 659, 646, 640, 38, 639, 638, 651, 47.26, 47.33, 47.24, 47.17, 47.16, 47.2; 296/20

[56] References Cited

U.S. PATENT DOCUMENTS

| 910,728 | 1/1909 | Russell | 296/20 |
|---|---|---|---|
| 2,984,500 | 5/1961 | Nolen | 280/47.26 |
| 3,367,676 | 2/1968 | Pearson et al. | 280/654 |
| 3,930,663 | 1/1976 | Scripter | 280/639 |

FOREIGN PATENT DOCUMENTS

| 96229 | 3/1924 | Austria | 296/20 |
|---|---|---|---|
| 126285 | 9/1949 | Sweden | 280/47.33 |

Primary Examiner—Joseph F. Peters, Jr.
Assistant Examiner—Milton L. Smith
Attorney, Agent, or Firm—Christie, Parker & Hale

[57] ABSTRACT

A folding cart having a flexible container suspended from a rectangular rigid frame forming the mouth of the container. The rectangular frame is supported on the axle between two wheels by upright members pivotally connected to the two sides of the rectangular frame near the center. A handle extends from the axle and is joined to the rectangular frame at one end of the frame. The point of connection can be moved along the handle away from the axle to rotate the upright members to a folded position. Legs attached to the rectangular frame prevent tipping about the axle and wheels. The legs can be folded upwardly against the bottom of the container to fold the bottom of the container against the rectangular frame.

11 Claims, 4 Drawing Figures

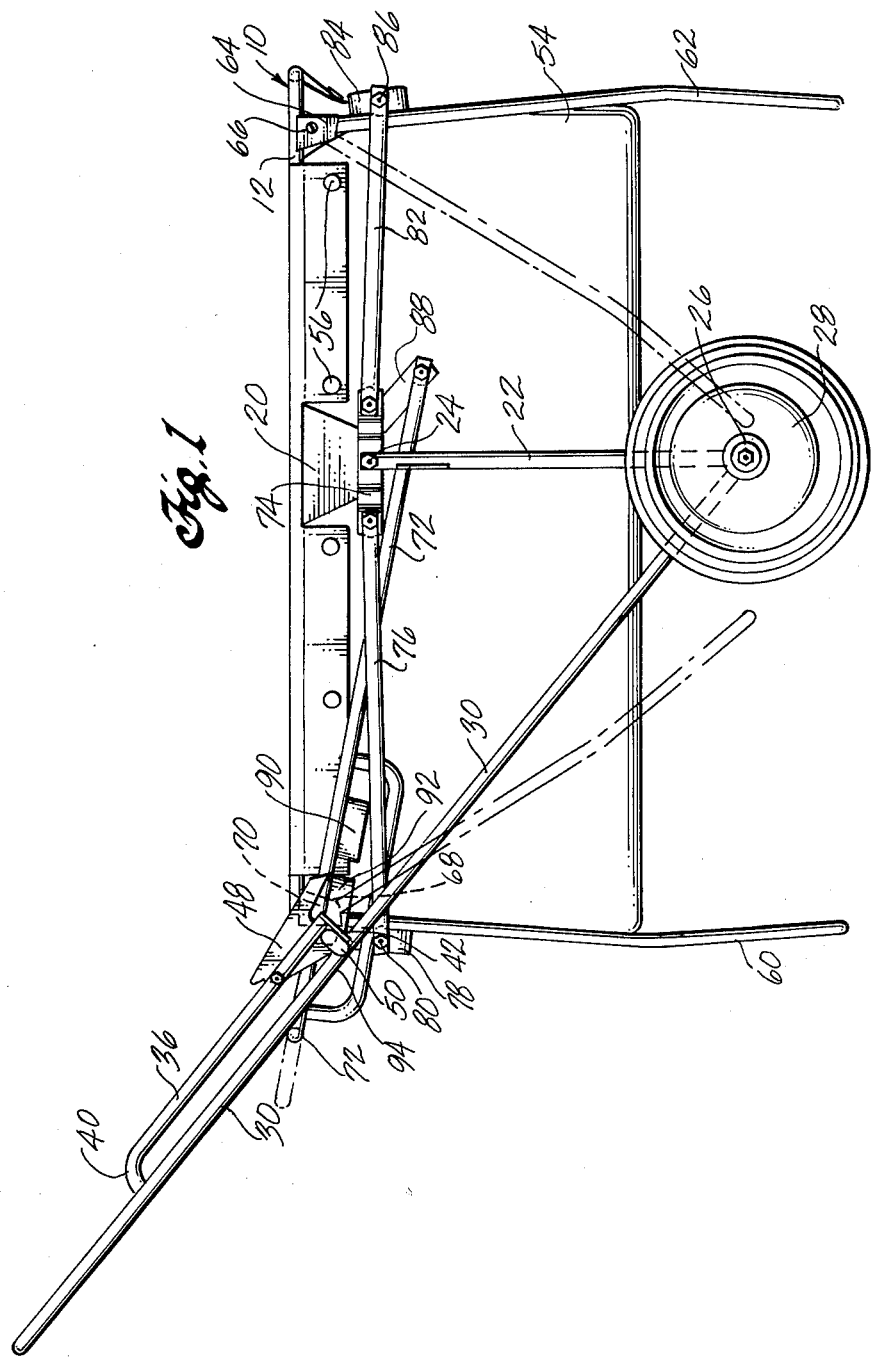

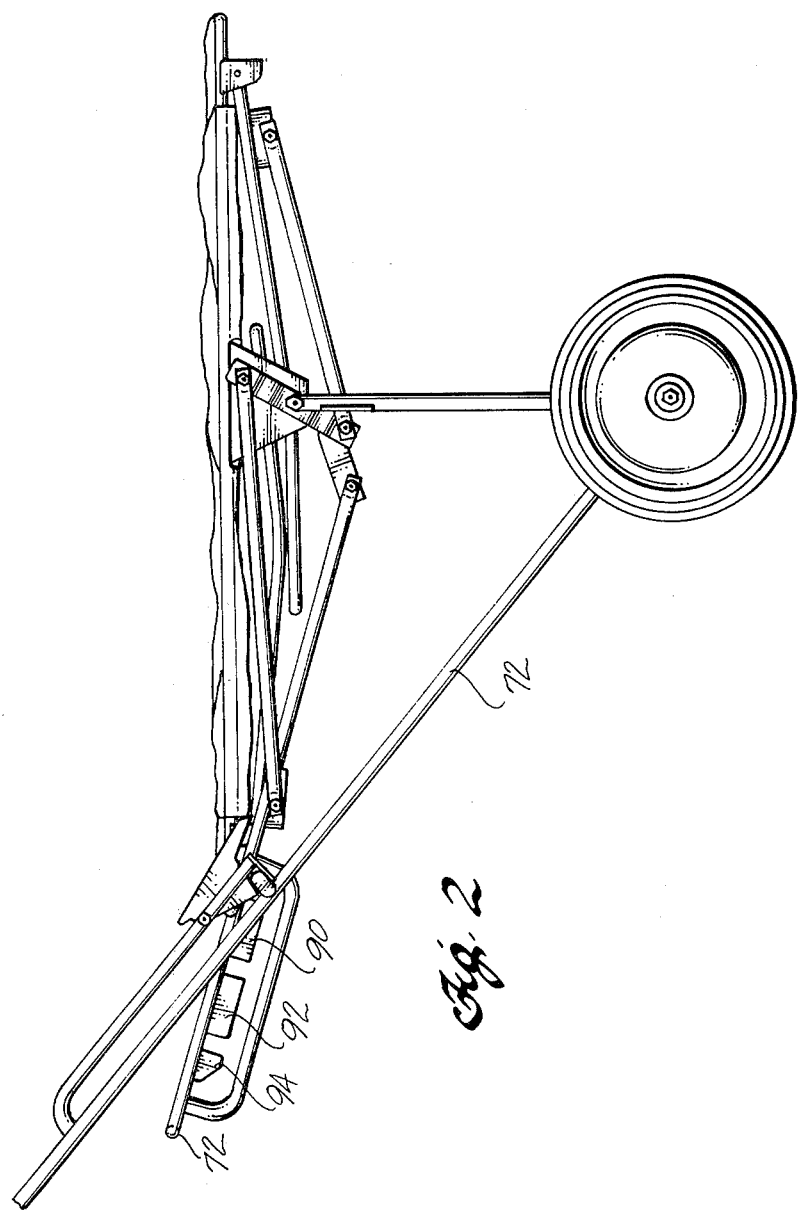

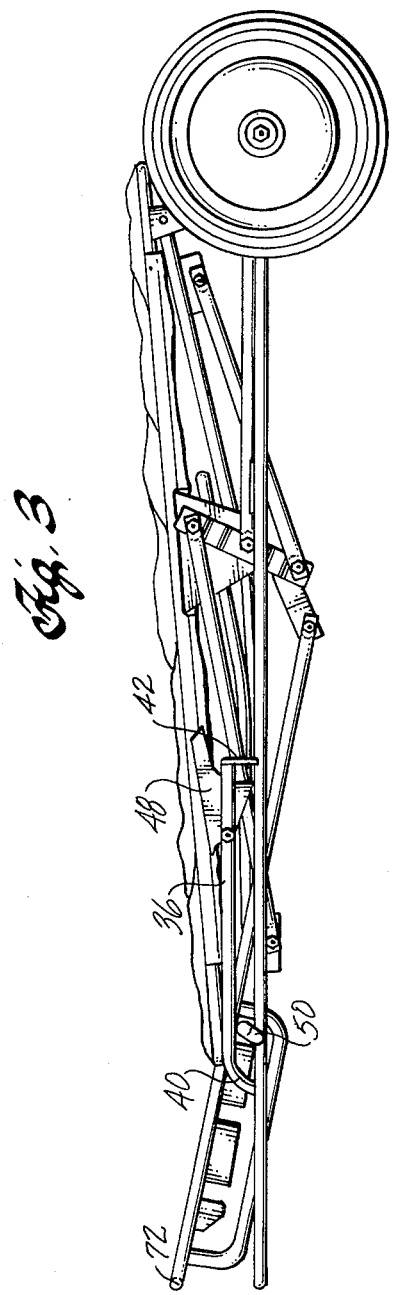

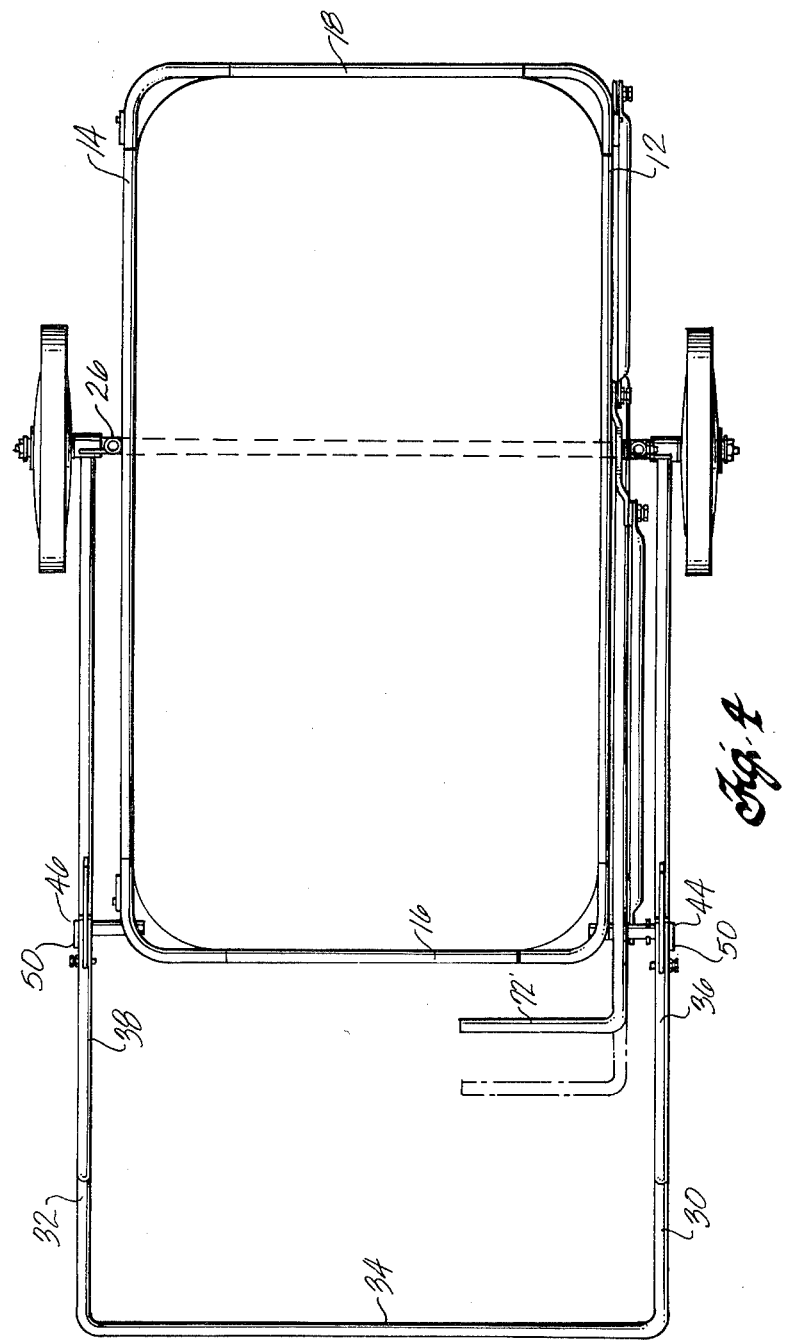

4,337,966

FOLDING UTILITY CART

FIELD OF THE INVENTION

This invention relates to a hand-wheeled cart, and more particularly, to a folding cart for packages and other lightweight materials.

BACKGROUND OF THE INVENTION

While carts of various design suitable for all types of purposes have been heretofore proposed, there is a need for a hand-wheeled cart of relatively large capacity for carrying packages and other bulky but relatively lightweight materials. Such a cart must be light in weight, have only one or two wheels so that it can be maneuvered over uneven terrain including steps and curbs, yet be stable in its support while being loaded. It also should be capable of easily folding into a flat, easily storable condition when not in use. Known devices in common use, such as wheelbarrows, shopping carts, and hampers on rollers lack one or more of these desirable features.

SUMMARY OF THE INVENTION

The present invention is directed to an improved folding cart which is lightweight, provides a relatively large storage capacity, and has only two wheels which carry substantially the full load. Even though it has only two wheels supporting the weight, it is held in a stable position during loading and unloading regardless of the weight distribution of the load. The cart of the present invention, by releasing a simple latch, can be folded into a relatively flat space with the wheels at one end and the handle at the other, permitting the cart to be wheeled in its folded condition and stored in a minimum of space.

These and other advantages of the present invention are achieved by providing a folding cart comprising a main framework which includes a single axle, a pair of wheels journaled at either end of the axle, a rectangular open frame, a pair of upright members pivotally attached at one end to the sides of the open frame near the center of the open frame, the upright members being pivotally attached at the other end to the axle. A U-shaped handle is pivotally connected at either end to the axle. The side portions of the U-shaped handle are adjustably connected to the open frame adjacent one end thereof, the connection being movable along the side portions of the U-shaped handle to permit folding and unfolding of the cart framework. A pair of U-shaped legs have the ends thereof pivotally connected to the open frame with one leg adjacent one end and the other leg adjacent the other end of the frame. Linkage means moves the legs between a vertical position in which they support the cart when it is at rest and a retracted position out of the way when the cart is being wheeled. The legs can also be moved into a position in which they cause a flexible container suspended from the open frame to be folded in accordian fashion when the cart is stored.

BRIEF DESCRIPTION OF THE DRAWINGS

For a better understanding of the invention, reference should be made to the accompanying drawings, wherein:

FIG. 1 is a side elevational view of the cart in its stationary or load transporting condition;

FIG. 2 is a side elevational view of the cart in its partially folded condition;

FIG. 3 is a side elevational view of the cart in its completely folded condition; and FIG. 4 is a top view of the cart in its stationary or load transporting condition.

DETAILED DESCRIPTION

Referring to the drawings in detail, the main framework of the cart includes an open rectangular frame member 10 preferably constructed of a pair of side rods 12 and 14 joined by a pair of end rods 16 and 18. The side rods 12 and 14 each have a central bracket 20 welded or otherwise secured thereto. A pair of upright frame support members 22 are pivotally connected at their upper end to the brackets 20 by pivot pins 24 while the lower ends of the frame members 22 are attached to an axle 26. A pair of wheels 28 are journaled at either end of the axle 26. The open frame member 10 is used to support and form the mouth of a flexible bag or container 54.

A U-shaped handle includes a pair of side rods 30 and 32 joined at their upper ends by a cross rod 34. The lower ends of the side rods 30 and 32 are pivotally connected to the axle 26 so that the handle can be raised and lowered in the manner hereinafter described. Secured to the side rods 30 and 32 are a pair of guide members 36 and 38 which extend parallel to the side rods. The guide members 36 and 38 are connected at either end to the side rods of the handle by means of a curved end 40 and a stop member 42. A pair of guide pins 44 and 46, secured to the open frame 10 adjacent the end rod 16, project into the spaces formed between the guide members 36 and 38 and the respective side rods 30 and 32. A latch 48 locks the pin 44 against the stop 42 to hold the framework with the wheels extended in the manner shown in FIGS. 1 and 2. When the latch is released, the pins 44 and 46 are free to slide up the handle towards the curved end 40, allowing the members 22 to rotate and the outer end rod 18 of the open frame 10 to fold back away from the wheels as shown in FIG. 3. Flange members 50 on the ends of the pins 44 and 46 restrict the lateral movement of the handle by slidably engaging the outside edges of the rods 30 and 32.

The container or bag 54 is made of suitable flexible material such as canvas, plastic or the like and is suspended at its upper edge from the open frame 10. To this end, the sides of the bag 54 are formed with a group of flaps at the upper edge which are folded over the top of the end and side rods of the frame 10 and secured by snaps 56 or other suitable means to the sides of the bag 54. Thus the bag 54 is held open at the top by the frame 10, forming a receptacle in which packages or bundles of materials to be transported can be stored. A stiffening member, such as a board, may be placed in the hollow of the bag to give the bag shape and to distribute the load.

A pair of U-shaped leg members 60 and 62 are pivotally attached to the open frame 10 adjacent either end. Thus the leg member 62 is attached to the frame 10 by a hinge bracket 64 and hinge pin 66 at either end of the U-shaped leg member. The hinge brackets 64 are welded or otherwise secured to the side rods 12 and 14 of the open frame 10. The ends of the U-shaped leg 60 are similarly attached to the side rods 12 and 14 of the frame 10 by hinge plates and hinge pins 68 and 70. The leg members 60 and 62 are rotated between three positions by a control handle 72 and linkage system. The linkage system includes a lever 74 pivotally supported on the pin 24. One end of the lever 74 is connected by a linkage arm 76 to the leg member 60 through a hinge plate 78 and hinge pin 80. The other end of the lever 74 is connected by a linkage arm 82 to the leg member 62 through a hinge plate 84 and hinge pin 86. The lever 74 is rotated by the handle 72 by pivotally connecting the one end of the handle 72 to the lever 74 through a bracket arm 88 which is rigidly attached to the lever 74.

The handle 72 normally rests on top of the pin 44. The handle is secured in any one of three positions by engaging the pin 44 in one of three notches formed by detent plates 90, 92 and 94 welded or otherwise secured to the underside of the handle 72. The upper end of the handle 72 is bent 90 degrees, as indicated at 72', to permit the handle to be gripped and moved from notch to notch. In doing so, the linkage moves the leg members 60 and 62 from the vertical position shown in FIG. 1 to an intermediate dotted position shown in FIG. 1 and to a completely retracted position shown in FIGS. 2 and 3.

When in the vertical position, the legs 60 and 62 stabilize the cart when it is parked for loading and unloading. When in the intermediate position, shown dotted in FIG. 1, the leg members are moved out of the way to permit the cart to be wheeled from location to location. When the legs are moved to the fully retracted position, as shown in FIGS. 2 and 3, they engage and lift the bottom of the bag 54 to collapse the container. Once in the fully retracted position, the latch 48 can be released to allow the frame to collapse into the folded position shown in FIG. 3. In this position, the cart can still be wheeled about by the handle, and can be hung against the wall or otherwise stored in a relatively small space.

When in the folded position of FIG. 3, the cart can be easily unfolded by raising the hand rod 34 of the handle past the vertical position in which the weight of the open frame 10 causes the pins 44 and 46 to slide down the guide against the stops 42 where they are held by the latches 48. The legs can then be released to either the intermediate or fully lowered vertical positions by the handle 72. To fold the cart, the legs 60 and 62 are first fully retracted by the handle 72, the latches 48 are released and the end rod of the handle is lowered, causing the pins 44 and 46 to slide away from the stops 42 and the framework to collapse into the folded condition.

From the above description it will be seen that a very practical lightweight folding cart has been provided which provides a rather large storage capacity in terms of its total size. In transit, substantially all the weight of the load is transferred directly to the two wheels, making it easy to move the cart. The folding legs allow the cart to be parked in a stable loading condition which prevents the cart from tipping with uneven distribution of the load on either side of the axle.

What is claimed is:

1. A folding cart comprising a container support frame, an axle, a pair of spaced wheels on the axle, a handle secured to the axle, and a pair of spaced upright members secured to the axle extending above the wheels, a container suspended between the upright members from the support frame, the support frame being pivotally attached to the upper end of and supported between the upright members, adjustable means securing the support frame to the handle adjacent one end of the container to hold the container, handle and upright members in rigid relationship, a pair of leg members pivotally secured to the container support frame respectively in front of and behind the axle, and control means linking the leg members for adjusting the angular position of the two leg members relative to the container between a substantially vertical position in which the container is prevented from tipping about the axle and a folded position in which the container is freely supported and transportable on the two wheels.

2. The apparatus of claim 1 further including means for adjusting the position along the handle of said means securing the container support frame to the handle to change the angle between the handle and the upright members.

3. The apparatus of claim 2 wherein the container includes flexible side walls suspended from the support frame.

4. Apparatus of claim 3 wherein said control means is further adjustable to rotate the leg members into storage position against the bottom of the container to push the bottom upwardly toward the open frame, folding the flexible side walls and collapsing the container.

5. The apparatus of claim 4 wherein said control means includes detent means for selectively locking the legs in the vertical position, the folded position, or the storage position.

6. The apparatus of claim 1 wherein the container includes flexible side walls suspended from the support frame.

7. Apparatus of claim 6 wherein said control means is further adjustable to rotate the leg members into storage position against the bottom of the container to push the bottom upwardly toward the open frame, folding the flexible side walls and collapsing the container.

8. The apparatus of claim 7 wherein said control means includes detent means for selectively locking the legs in the vertical position, the folded position, or the storage position.

9. A folding cart comprising a main framework including an axle, a pair of wheels journaled on the axle, a rigid unitary rectangular open frame, a container supported on the open frame, a pair of upright members pivotally secured at one end to the sides of the open frame intermediate the ends and at the other end to the axle, a handle member having substantially parallel side portions pivotally connected to the axle, means connecting the sides of the open frame adjacent one end of the open frame to the side portions of the handle, a pair of leg members pivotally connected to the open frame, one leg member adjacent one end of the open frame and the other leg member adjacent the other end, the leg members being rotatable about axes parallel to said axle, and means selectively positioning the leg members in a substantially vertical support position and in a folded position.

10. Apparatus of claim 9 wherein said last-named means includes detent means for securing the leg members in either the support position or the folded position.

11. Apparatus of claim 9 further including means for shifting the means connecting the sides of the open frame to the side portions of the handle along the side portions of the handle away from the wheels to reduce the angle between the handle and the upright members to substantially zero, thereby collapsing the cart.

* * * * *

UNITED STATES PATENT AND TRADEMARK OFFICE
CERTIFICATE OF CORRECTION

PATENT NO. : 4,337,966
DATED : July 6, 1982
INVENTOR(S) : ROGER D. STEVENS

It is certified that error appears in the above—identified patent and that said Letters Patent is hereby corrected as shown below:

Column 2, line 10, after "14" insert -- each --;
          line 11, delete "each".

Signed and Sealed this

Thirtieth Day of November 1982

[SEAL]

Attest:

GERALD J. MOSSINGHOFF

Attesting Officer     Commissioner of Patents and Trademarks